United States Patent
Gernoth et al.

(10) Patent No.: US 10,896,318 B2
(45) Date of Patent: Jan. 19, 2021

(54) OCCLUSION DETECTION FOR FACIAL RECOGNITION PROCESSES

(71) Applicant: Apple Inc., Cupertino, CA (US)

(72) Inventors: Thorsten Gernoth, San Francisco, CA (US); Ian R. Fasel, San Francisco, CA (US); Touraj Tajbakhsh, San Jose, CA (US); Jia-Chi Wu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 15/934,559

(22) Filed: Mar. 23, 2018

(65) Prior Publication Data

US 2019/0080149 A1    Mar. 14, 2019

Related U.S. Application Data

(60) Provisional application No. 62/556,795, filed on Sep. 11, 2017, provisional application No. 62/556,407, filed on Sep. 9, 2017.

(51) Int. Cl.
G06K 9/66 (2006.01)
G06K 9/00 (2006.01)
(Continued)

(52) U.S. Cl.
CPC ......... *G06K 9/00255* (2013.01); *G06F 21/32* (2013.01); *G06K 9/00221* (2013.01);
(Continued)

(58) Field of Classification Search
CPC ........... G06K 9/00221; G06K 9/00248; G06K 9/00255; G06K 9/00281; G06K 9/00288; G06K 9/00597; G06K 9/00926; G06K 9/03; G06K 9/036; G06K 9/34; G06K 9/46; G06K 9/4604; G06K 9/4642; G06K 9/62; G06K 9/78; G06K 9/80; G06K 9/82; G06T 2207/10048; G06T 2207/20081; G06T 2207/30168; G06T 2207/30196; G06T 2207/30201; G06F 21/30; G06F 21/31; G06F 21/32; G06F 21/44
USPC ........ 382/100, 115, 117, 118, 154–156, 159, 382/173, 181, 190, 195, 209, 216–219, 382/224, 282, 325; 340/5.2, 5.8, 5.81, 340/5.82, 5.83
See application file for complete search history.

(56) References Cited

U.S. PATENT DOCUMENTS

7,406,184 B2    7/2008  Wolff et al.
8,150,142 B2    4/2012  Freedman et al.
(Continued)

*Primary Examiner* — Eric Rush
(74) *Attorney, Agent, or Firm* — Kowert, Hood, Munyon, Rankin & Goetzel, P.C.; Gareth M. Sampson (57) ABSTRACT

Occlusion of facial features may be detected and assessed in an image captured by a camera on a device. Landmark heat maps may be used to estimate the location of landmarks such as the eyes, mouth, and nose of a user's face in the captured image. An occlusion heat map may also be generated for the captured image. The occlusion heat map may include values representing the amount of occlusion in regions of the face. The estimated locations of the eyes, mouth, and nose may be used in combination with the occlusion heat map to assess occlusion scores for the landmarks. The occlusion scores for the landmarks may be used control one or more operations of the device.

20 Claims, 9 Drawing Sheets

(51) Int. Cl.
    *G06F 21/32*     (2013.01)
    *G06K 9/03*     (2006.01)
    *G06K 9/80*     (2006.01)

(52) U.S. Cl.
    CPC ..... *G06K 9/00248* (2013.01); *G06K 9/00281* (2013.01); *G06K 9/00288* (2013.01); *G06K 9/00926* (2013.01); *G06K 9/036* (2013.01); *G06K 9/80* (2013.01)

(56) References Cited

U.S. PATENT DOCUMENTS

| | | | |
|---|---|---|---|
| 8,384,997 B2 | 2/2013 | Shpunt et al. | |
| 8,483,450 B1* | 7/2013 | Derakhshani | G06K 9/00597 382/117 |
| 8,749,796 B2 | 6/2014 | Pesach et al. | |
| 8,948,517 B2* | 2/2015 | Lin | G06K 9/00281 382/195 |
| 9,025,836 B2 | 5/2015 | Ptucha | |
| 9,189,886 B2 | 11/2015 | Black et al. | |
| 9,436,892 B2* | 9/2016 | Hu | G06K 9/00288 |
| 9,916,495 B2* | 3/2018 | Hayasaka | G06K 9/00281 |
| 10,043,058 B2* | 8/2018 | Ahmed | G06K 9/00288 |
| 2006/0291001 A1* | 12/2006 | Sung | G06K 9/00281 358/453 |
| 2007/0201726 A1* | 8/2007 | Steinberg | G06K 9/03 382/103 |
| 2008/0175448 A1* | 7/2008 | Fujiwara | G06K 9/00208 382/118 |
| 2013/0247175 A1* | 9/2013 | Nechyba | G06K 9/00221 382/118 |
| 2014/0240477 A1* | 8/2014 | Feng | H04N 5/217 348/77 |
| 2015/0110349 A1* | 4/2015 | Feng | G06K 9/00234 382/103 |
| 2016/0110586 A1* | 4/2016 | Hayasaka | G06K 9/00281 382/118 |
| 2016/0178915 A1 | 6/2016 | Mor et al. | |
| 2016/0275518 A1* | 9/2016 | Bowles | G06K 9/00087 |
| 2018/0285628 A1* | 10/2018 | Son | G06K 9/00228 |
| 2019/0035149 A1* | 1/2019 | Chen | G06K 9/00248 |
| 2020/0034657 A1* | 1/2020 | Yi | G06K 9/00281 |

* cited by examiner

OCCLUSION DETECTION FOR FACIAL RECOGNITION PROCESSES

PRIORITY CLAIM

This patent claims priority to U.S. Provisional Patent Application No. 62/556,407 to Fasel et al., entitled "OCCLUSION DETECTION FOR FACIAL RECOGNITION PROCESSES", filed Sep. 9, 2017 and to U.S. Provisional Patent Application No. 62/556,795 to Fasel et al., entitled "OCCLUSION DETECTION FOR FACIAL RECOGNITION PROCESSES", filed Sep. 11, 2017, both of which are incorporated by reference in their entirety.

BACKGROUND

1. Technical Field

Embodiments described herein relate to methods and systems for face detection and recognition in images capture by a camera on a device. More particularly, embodiments described herein relate to the detection and assessment of occlusion of facial features in captured images.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

In some cases, an image captured of a user during a facial recognition process (e.g., either an enrollment process or an authentication process) may include at least some occlusion of the user in the image. Occlusion of the user includes the blocking or obscuring of the user (e.g., the face of the user or some portion of the user's face) by some object (e.g., a finger, a hand, hair, masks, scarfs, etc.) in the image. Occlusion of the user in captured images may reduce the effectiveness of processing the image in the facial recognition process.

SUMMARY

Landmark and occlusion heat maps may be generated and used to assess occlusion of landmarks on a user's face in a captured image. Landmark heat maps may be grid representations of the user's face that are used to estimate the location of landmarks on the user's face in the captured image. The occlusion heat map may be a grid representation of the user's face that includes scaled values representing the amount of occlusion in the regions of the grid. The estimated locations of the landmarks may be used in combination with the occlusion heat map to determine if and how much occlusion of the landmarks there may be in the captured image (e.g., an occlusion score for each of the landmarks). Determined values of occlusion for the landmarks may be used to control one or more operations of the device.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

Figure 1:
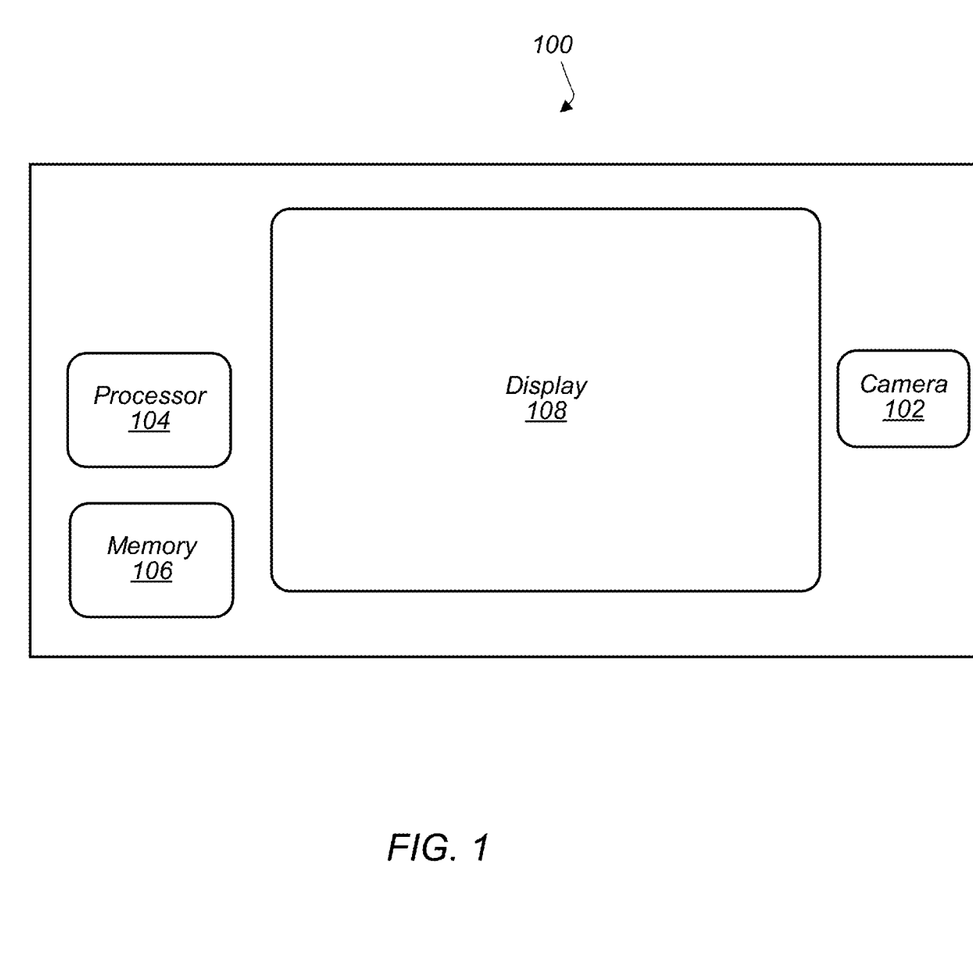
FIG. 1 depicts a representation of an embodiment of a device including a camera.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
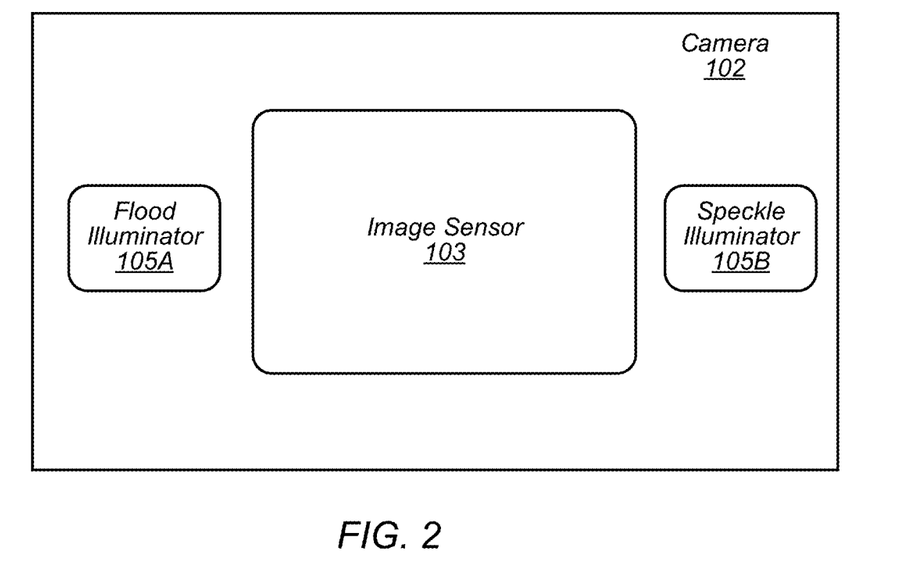
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator) and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor used to capture infrared images used for face detection and/or depth detection. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light. For depth detection or generating a depth map image, illuminator 105B may provide IR illumination with a speckle pattern. The speckle pattern may be a pattern of light spots (e.g., a pattern of dots) with a known, and controllable, configuration and pattern projected onto a subject. Illuminator 105B may include a VCSEL array configured to form the speckle pattern or a light source and patterned transparency configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
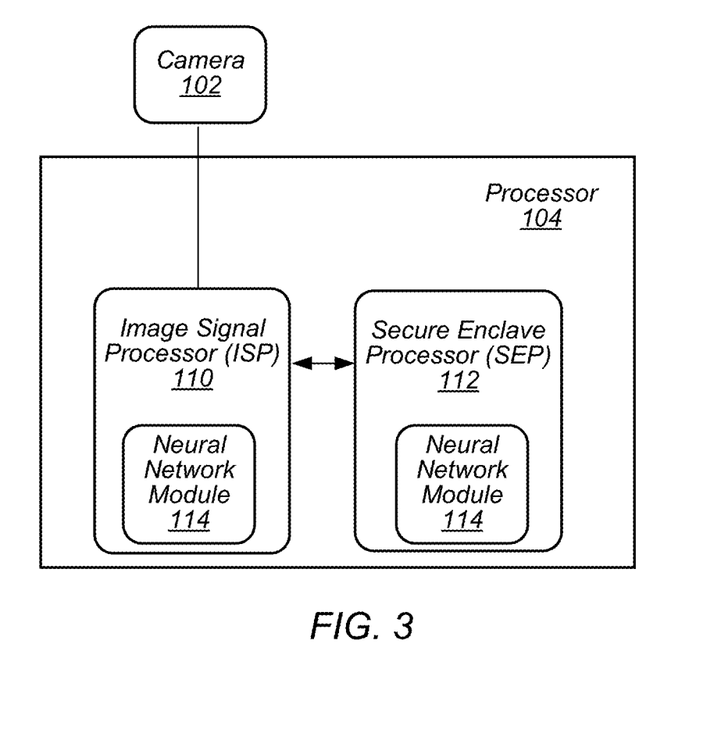
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture and store images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature data from the images) from the enrollment process are stored in a template in device 100. The template may be stored, for example, in a template space in memory 106 of device 100. In some embodiments, the template space may be updated by the addition and/or subtraction of images from the template. A template update process may be performed by processor 104 to add and/or subtract template images from the template space. For example, the template space may be updated with additional images to adapt to changes in the authorized user's appearance and/or changes in hardware performance over time. Images may be subtracted from the template space to compensate for the addition of images when the template space for storing template images is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR images and depth map images independently of each other before a final authentication decision is made for the user. For example, ISP 110 may process the images independently to determine characteristics of each image separately. SEP 112 may then compare the separate image characteristics with stored template images for each type of image to generate an authentication score (e.g., a matching score or other ranking of matching between the user in the captured image and in the stored template images) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored template images to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

Figure 4:
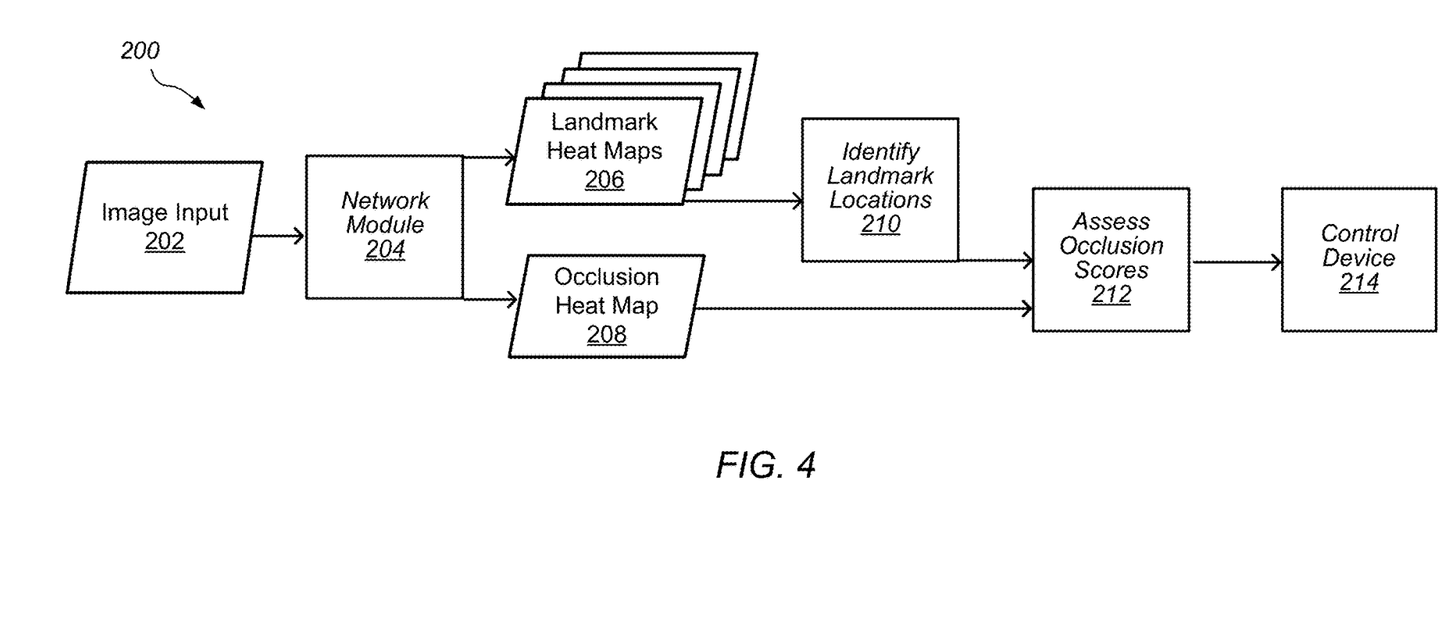
FIG. 4 depicts a flowchart for an embodiment of an occlusion detection process.

FIG. 4 depicts a flowchart for an embodiment of occlusion detection process 200. In certain embodiments, process 200 is implemented using neural network module 114 (another network module and/or another machine learning model) associated with ISP 110. Process 200 may begin with image input 202. Image input 202 may be an image captured using camera 102 on device 100. In certain embodiments, the captured image is a flood image. In some embodiments, the captured image is a depth map image. The captured image may be captured during an enrollment process, a facial recognition authentication process, a template update process, or another facial recognition process operated by device 100.

Figure 5:
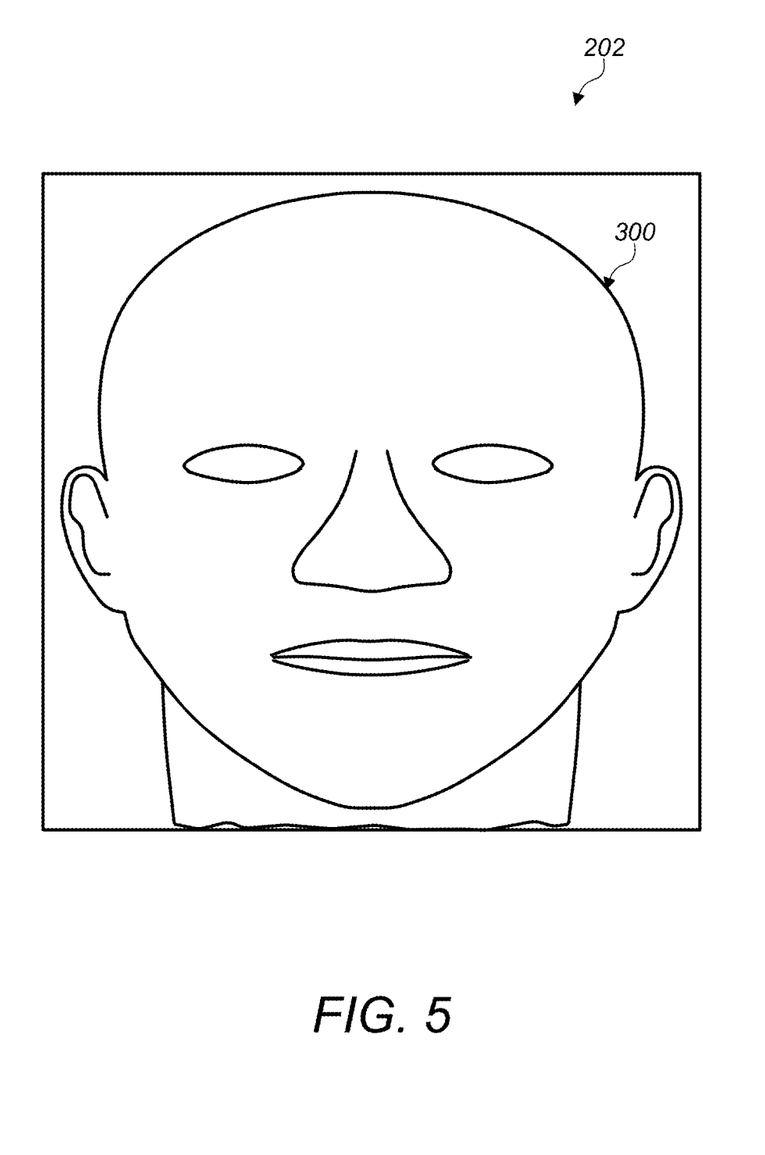
FIG. 5 depicts an example of an embodiment of an image input.

In certain embodiments, image input 202 is the entire face of the user. FIG. 5 depicts an example of an embodiment of image input 202. As shown in FIG. 5, face 300 may take up almost the entire space in image input 202. Features of face 300 are depicted in image input 202. Features may include, for example, eyes, nose, mouth, jawline, hairline, and/or outline of the head. In certain embodiments, image input 202 is a 128 pixel image of face 300. In some embodiments, image input 202 is an image that has been processed after being captured using camera 102. For example, camera 102 may capture an image showing face 300 as a smaller portion of the image. The captured image may then be processed to produce image input 202 with face 300, as shown in FIG. 5. For example, in some implementations, processor 104 may determine the location of a face in the image, determine a bounding box for the face, and crop the image along the borders of the bounding box. The image can also be processed to normalize the illumination levels in the image. In some embodiments, a face detection network (e.g., a face detection neural network) is used to produce image input 202.

In process 200, as shown in FIG. 4, image input 202 may be provided to network module 204. Network module 204 may process image input 202 to generate one or more landmark heat maps 206 and occlusion heat map 208. In certain embodiments, network module 204 is a neural network module. Network module 204 may include network circuitry installed or configured with operating parameters for producing landmark heat maps and occlusion heat maps. For example, network module 204 may be trained using training images labelled with selected landmark points (e.g., corners of eyes, tip of nose, corners of mouth, etc.) and occlusion indicia (e.g., different amounts and locations of occlusion) to generate operating parameters for the network circuitry. In some embodiments, network module 204 is trained with training data where landmark points are occluded and the data is labelled with where the landmark points are estimated to be located (e.g., a network trainer may indicate (click) where the landmark points are thought to be located).

Network module 204 may generate landmark heat maps 206 and occlusion heat map 208 as high-level grid representations of image input 202. For example, network module 204 may generate landmark heat maps 206 and occlusion heat map 208 as n×n grid representations of image input 202 where n×n is a lower resolution (e.g., lower number of pixels) than the image input. Thus, each heat map may be an n×n grid of regions or cells representing input image 202. In one embodiment, landmark heat maps 206 and occlusion heat map 208 are 16×16 grid representations of image input 202, which is a 128×128 pixel image.

Landmark heat maps 206 generated by network module 204 may include one heat map for each selected landmark point of interest in image input 202. The selected landmark points of interest may be predetermined for network module 204. For example, in one embodiment, landmark heat maps 206 includes 7 heat maps–1 heat map for each corner of each eye, 1 heat map for the tip of nose, and 1 heat map for each corner of the mouth. While the corners of the eyes and mouth and the tip of the nose are described as landmark points herein, it is to be understood that any landmark points may be used and any number of landmark points for a landmark may be used. For example, the nose may be defined by additional landmark points such as the sides of the nose in addition to the tip of the nose. As another example, cheek bones may be selected as a landmark and represented by landmark points for each cheek.

Figure 6:
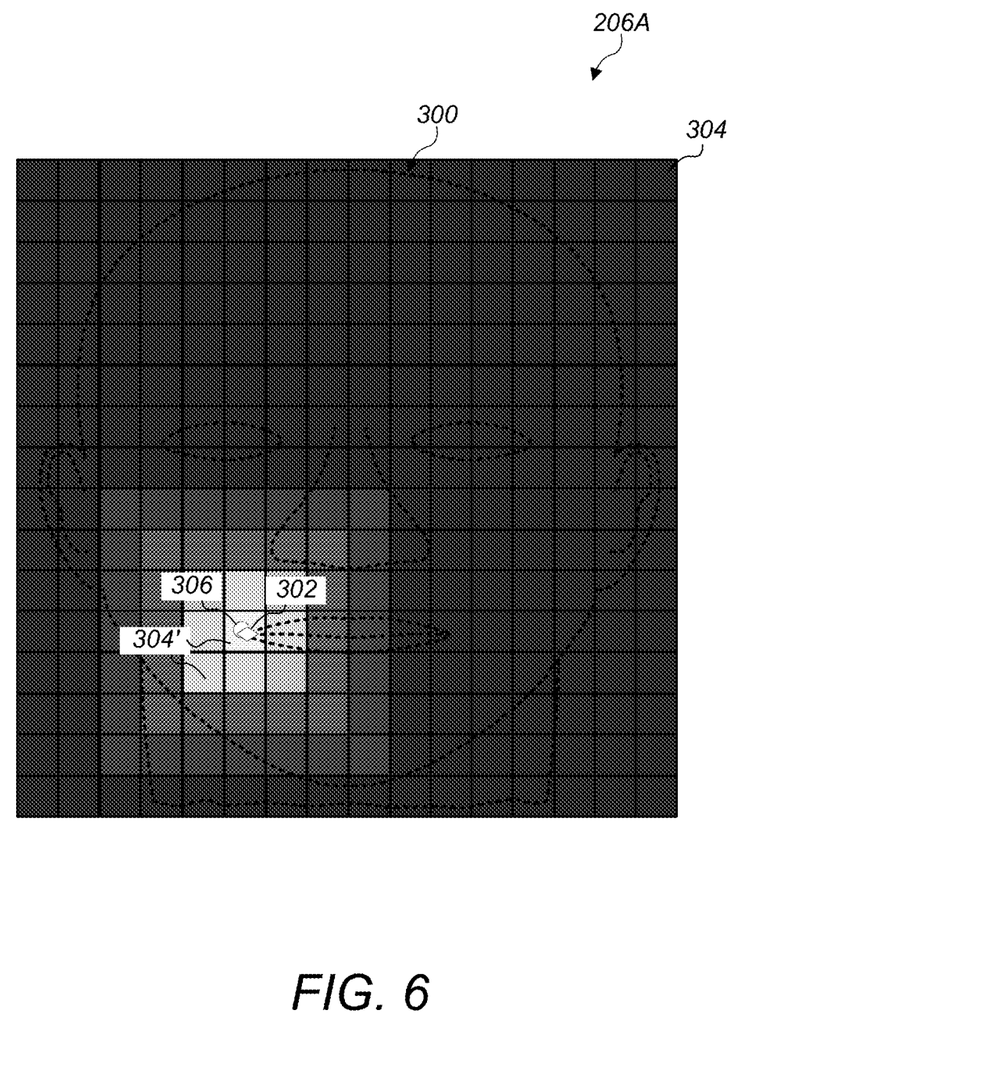
FIG. 6 depicts a representation of an embodiment of a grayscale image for an example of a landmark heat map.

Landmark heat maps 206 may be grid representations of image input 202 with each region (e.g., cell) having a value (e.g., a vector or number) that represents the likelihood that the landmark point is in that region. For example, the value in each region may be a number between 0 and 1 with 0 being not likely to be the landmark point and 1 being substantially likely to be the landmark point. Landmark heat maps 206 may be displayed as grayscale images with grayscale intensity representing the different values in each region. FIG. 6 depicts a representation of an embodiment of a grayscale image for an example of landmark heat map 206A. The features of face 300 are shown, for reference, as dashed lines in FIG. 6. The features of face 300, however, may not be visible in landmark heat map 206A.

Landmark heat map 206A is a representation of a heat map for landmark point 302. As shown in FIG. 6, landmark point 302 (the diamond) is the landmark point for the corner of the mouth on face 300. Landmark heat map 206A includes a 16×16 grid of regions 304 with each region having a grayscale value (e.g., grayscale intensity) representing the likelihood that landmark point 302 is in that region. Regions 304 around landmark point 302 are whiter than other regions further away from the landmark point because the likelihood that the landmark point 302 is in one of these regions is higher than the landmark point being in other regions. For example, as shown in FIG. 6, the regions (e.g., regions 304') around landmark point 302 are different shades of gray (e.g., a grayscale gradient) and are lighter (e.g., more white) as the probability that the landmark point 302 is included in the region increases. Similar landmark heat maps 206 may be generated for each of the other selected landmark points.

Figure 7:
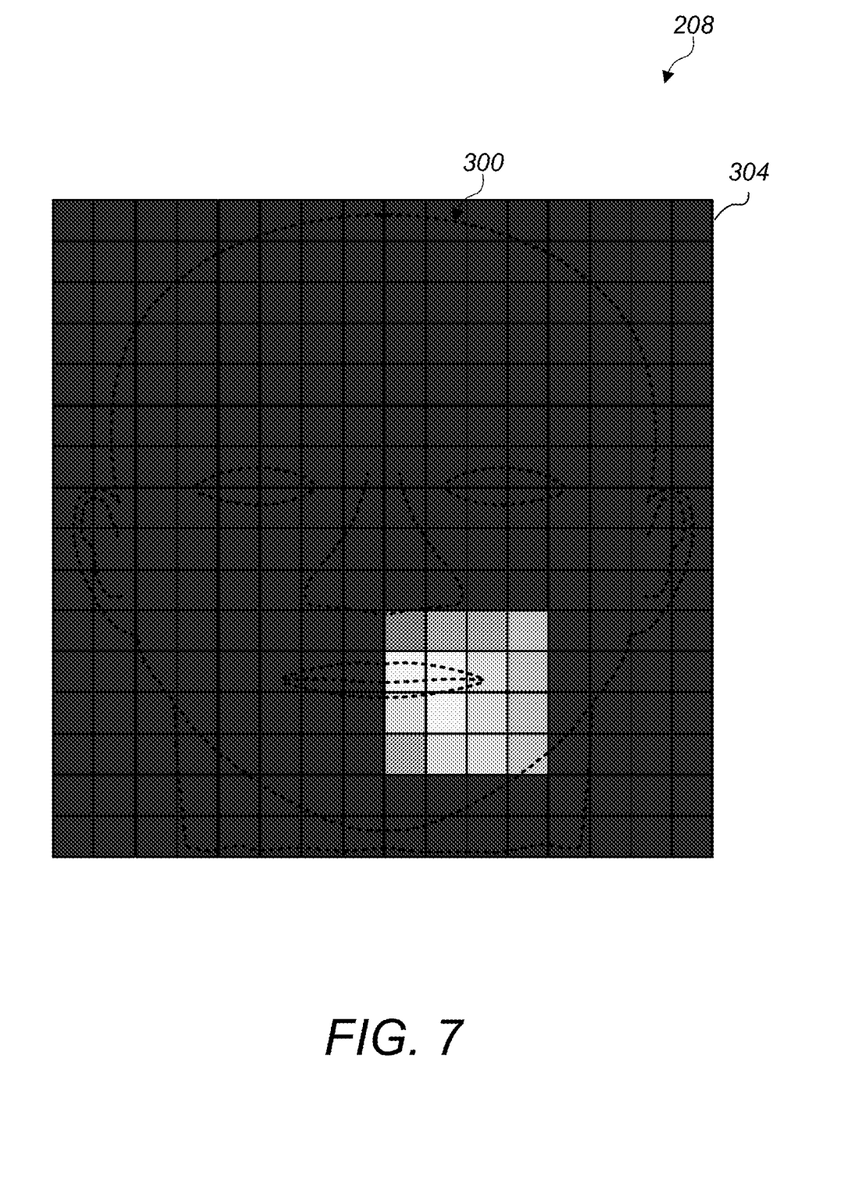
FIG. 7 depicts a representation of an embodiment of a grayscale image for an example of an occlusion heat map.

Occlusion heat map 208 may be a grid representation of image input 202 with each region (e.g., cell) having a value (e.g., a vector or number) that measures an amount of occlusion in that region as determined by network module 204. Occlusion heat map 208 may be displayed as a grayscale image with grayscale intensity representing different values of occlusion in the regions in the image. FIG. 7 depicts a representation of an embodiment of a grayscale image for an example of occlusion heat map 208. The features of face 300 are shown, for reference, as dashed lines in FIG. 7. The features of face 300, however, may not be visible in occlusion heat map 208.

Occlusion heat map 208 includes a 16×16 grid of regions 304 with each region having a grayscale value (e.g., grayscale intensity) representing a relative amount of occlusion determined for that region (e.g., a scaled value of occlusion determined for that region). In the example of FIG. 7, regions 304 around the corner of the mouth are shown as having some occlusion by the higher intensity (closer to white color) of those regions. The occlusion shown in FIG. 7 may be, for example, from the user's hand or a mask covering a portion of the mouth and the corner of the mouth.

In certain embodiments, after landmark heat maps 206 are generated, landmark locations are identified (e.g., estimated) in identify landmark locations 210. Identify landmark locations 210 may include generating two-dimensional representations of where the selected landmark points (e.g., landmark point 302) are positioned in each landmark heat map 206. The two-dimensional representation may be, for example, a two-dimensional vector representation of x- and y-coordinates of the landmark point with respect to the grid representing the heat maps.

In certain embodiments, the x- and y-coordinates for each landmark point are generated by finding the center of gravity in landmark heat maps 206. For example, as shown in FIG. 6, center of gravity 306 may be found as the center of gravity of the white (e.g., brightest) area (the "hot" area) in the grayscale image. Center of gravity 306 may be an approximation or estimate of the location of landmark point 302 based on the intensities and distribution of likelihood values for the landmark point. In some embodiments, the intensities and spreads of the likelihood values may be used to assess a confidence value for center of gravity 306 being landmark point 302.

The center of gravity for the different landmark points may be found in each of landmark heat maps 206. Thus, for an embodiment with 7 landmark heat maps 206, a list of 7 x- and y-coordinates, each coordinate representing one landmark point, may be generated. In some embodiments, the x- and y-coordinates may be represented as a floating-point vector (e.g., a normalized floating point vector).

In some embodiments, the landmark point in a landmark heat map may be occluded (not visible) and thus the heat map may not provide sufficient information to estimate the location of the landmark point. In such embodiments, the landmark point may still be estimated based on the grid representation of the face. For example, a neural network (or other processor) may predict where the landmark point may be based on other data. For example, the neural network can estimate the location of the nose relative to the estimated location of the corners of the eyes.

Figure 8:
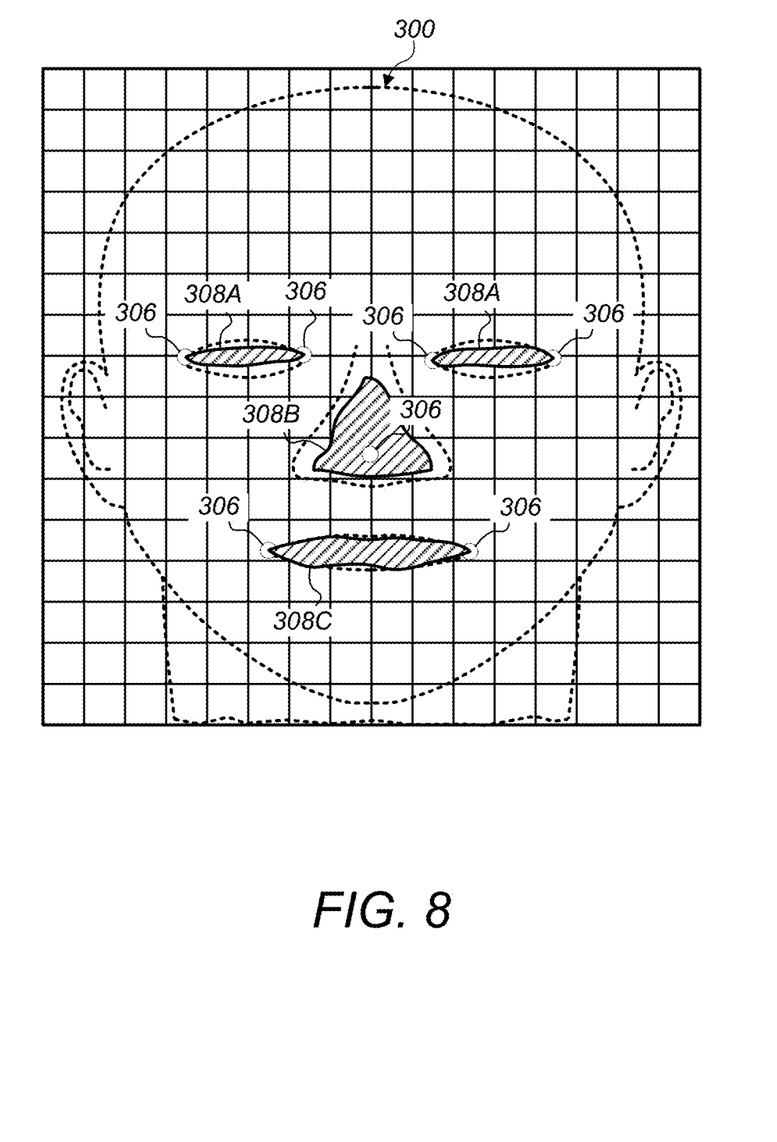
FIG. 8 depicts a representation of an example of an embodiment of estimated centers of gravity.

FIG. 8 depicts a representation of an example of an embodiment of estimated centers of gravity 306 with respect to the grid representation of face 300. FIG. 8 depicts the example with 7 landmark points from 7 landmark heat maps. Centers of gravity 306 may be estimates of the landmark points from each landmark heat map 206. From centers of gravity 306 (e.g., the landmark points), the four landmarks represented by these landmark points may be identified. For example, in the depicted embodiment, the mouth can be identified based on the estimated location of the two mouth corners and the right eye can be identified by the estimated locations of the two corners of the right eye. It is to be understood, however, that other landmarks may also be considered (e.g., ears, chin, etc.).

In certain embodiments, shapes 308 may be used to represent the landmarks. Shapes 308A may represent the eyes while shape 308B represents the nose and shape 308C represents the mouth. In some embodiments, shapes 308A are lines between the respective centers of gravity 306 for the eyes (i.e., corners of eyes), shape 308B is a circle centered on center of gravity 306 for the nose (i.e., tip of nose), and shape 308C is a line between the centers of gravity representing the corners of the mouth. In certain embodiments, shapes 308A and shapes 308C are represented by other shapes between centers of gravity 306 representing the corners of the eyes and the mouth with the shapes including the corners. Shape 308B may be a triangle or other representative shape drawn around center of gravity 306 for the nose landmark. In some embodiments, the shape of shapes 308A, 308B, 308C are based on intensity spread around centers of gravity 306. Any heuristic may be used to determine the shape of shapes 308A, 308B, 308C based on the intensity spread.

Once the locations of the landmarks are identified in 210, the identified landmark locations are combined with occlusion heat map 208 to assess occlusion scores for the landmarks in 212. Combining the identified landmark locations and occlusion heat map 208 may include bringing together or fusing the locations and the occlusion map. For example, the shapes used to identify the landmark locations may be mapped onto occlusion map 208. As an example, FIG. 9 depicts occlusion heat map 208 (from FIG. 7) overlaid onto the map of landmark shapes (from FIG. 8).

Figure 9:
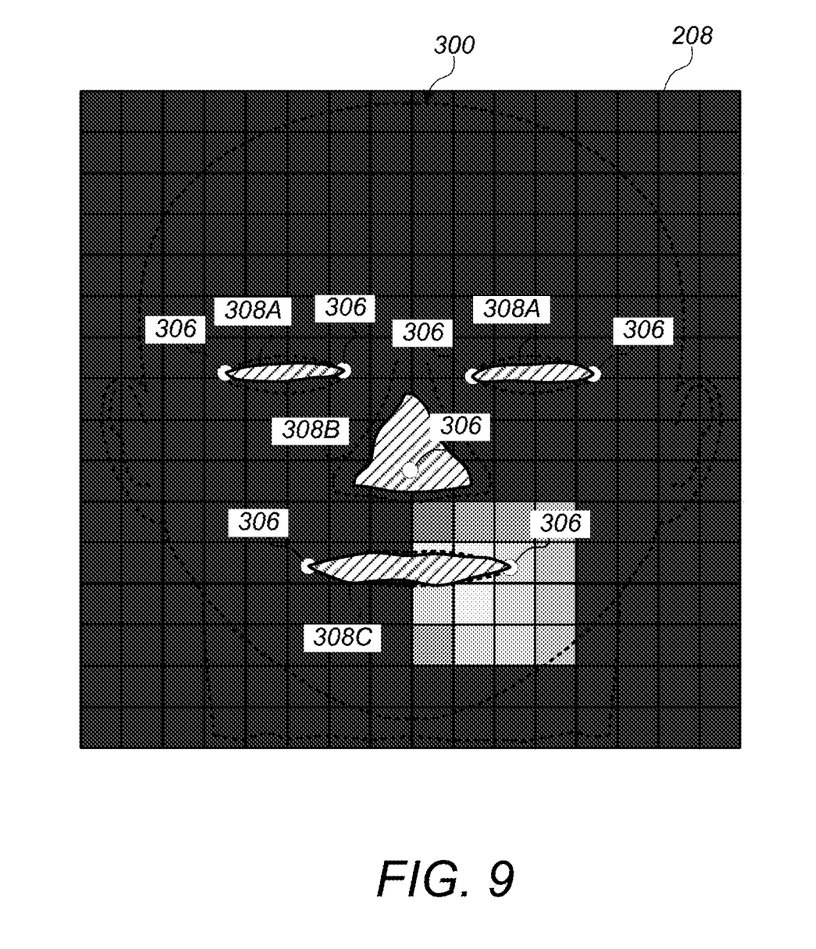
FIG. 9 depicts an occlusion heat map overlaid onto a map of landmark shapes.

Once the identified landmark locations are combined with occlusion heat map 208, as depicted in the example of FIG. 9, an occlusion score may be assessed for each of the landmark shapes (e.g., for the eyes, the nose, and the mouth). The occlusion score may be a measurement or value that represents an estimation of how much the landmark shape is occluded. For example, the occlusion score may be a scaled value of occlusion (e.g., a value between 0 and 1 with 0 not being occluded and 1 being completely occluded) or a percentage occlusion value (e.g., from 0% occlusion to 100% occlusion). For the example shown in FIG. 9, a percentage occlusion score for the eyes and nose may be 0% as neither landmark shape has any occlusion while a percentage occlusion score for the mouth may be about 40% as a portion of the mouth is occluded.

After the occlusion scores for the landmarks are assessed in 212, an operation of device 100 may be controlled based on the assessed occlusion scores in 214. In some embodiments, the assessed occlusion scores are used to control operation of device 100 during an enrollment process (e.g., an image enrollment process) or a template update process. For example, the image captured to generate image input 202 may be discarded (e.g., rejected) from the enrollment process (or the template update process) if one or more of the assessed occlusion scores (or a composite occlusion score) are above a selected occlusion threshold. Discarding or rejecting the captured image may include, for example, removing or deleting the captured image from device 100 (e.g., removing or deleting the captured image from the memory of the device) or preventing the captured image to be used for facial recognition, enrollment, or other applications of the captured image on the device. The selected occlusion threshold may be a maximum level of occlusion selected to ensure that the face of the user has levels of occlusion that are sufficiently low to allow additional processing of the image to be effective. For example, only allowing images with levels of occlusion below the maximum level of occlusion to be used during the enrollment process (or the template update process) may reduce the false acceptance rate during a facial recognition authentication process using the templates generated during the enrollment process (or the template update process).

In some embodiments, the assessed occlusion scores are used to control operation of device 100 during a facial recognition authentication process. For example, unlocking device 100 (or another function controlled by the facial recognition authentication process) may be prevented from occurring if one or more of the assessed occlusion scores (or a composite occlusion score) are above a selected occlusion threshold. In certain embodiments, the captured image is discarded (e.g., rejected) by the facial recognition authentication process when unlocking the device is prevented based on the assessed occlusion scores. Discarding or rejecting the captured image may include, for example, removing or deleting the captured image from device 100 (e.g., removing or deleting the captured image from the memory of the device). In some embodiments, the threshold for occlusion in the facial recognition authentication process is lower than the threshold for occlusion in the enrollment process or the template update process. Having a lower threshold for occlusion in the facial recognition authentication process may provide a higher acceptance rate and a more beneficial experience for the user.

In some embodiments, if occlusion of a landmark is above a selected level during the facial recognition authentication process, the facial recognition authentication process may ignore the occluded landmark for a matching decision between the user in the captured image and an authorized user. In some embodiments, the facial recognition authentication process may increase the thresholds for matching of other landmarks when the occluded landmark is ignored. The effectiveness of the facial recognition authentication process may be increased by allowing the process to ignore the occluded landmark and/or focus on landmarks that are not occluded when authenticating the user.

In some embodiments, if a landmark is occluded above a selected occlusion threshold, device 100 may notify the user in the captured image that the landmark is occluded. For example, the user may be notified during an enrollment process (or any other facial recognition process) that the landmark (e.g., eyes, nose, or mouth) is occluded and that the occluding object should be moved or removed and another image should be captured. Notification to the user may be, for example, via a display or a voice prompt on device 100.

In certain embodiments, one or more process steps described herein may be performed by one or more processors (e.g., a computer processor) executing instructions stored on a non-transitory computer-readable medium. For example, process 200, shown in FIG. 4, may have one or more steps performed by one or more processors executing instructions stored as program instructions in a computer readable storage medium (e.g., a non-transitory computer readable storage medium).

Figure 10:
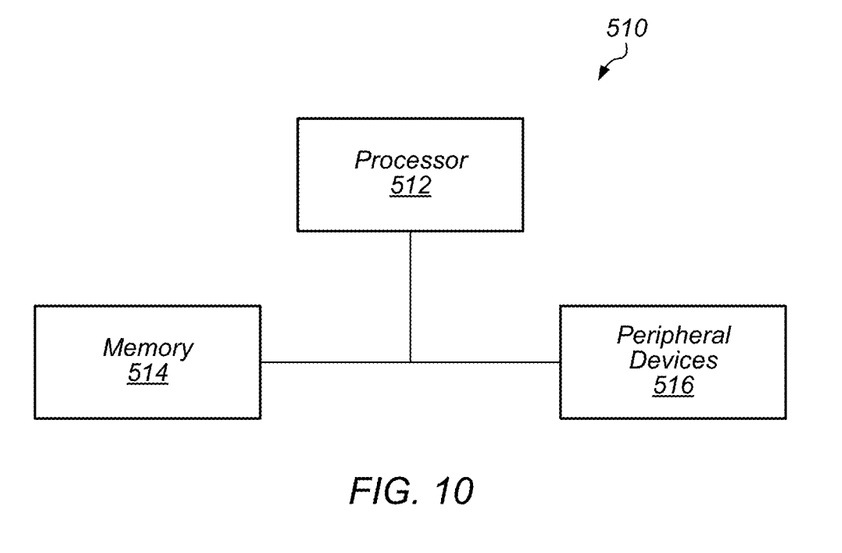
FIG. 10 depicts a block diagram of one embodiment of an exemplary computer system.

FIG. 10 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, shown in FIG. 4. In the embodiment of FIG. 10, computer system 510 includes processor 512, memory 514, and various peripheral devices 516. Processor 512 is coupled to memory 514 and peripheral devices 516. Processor 512 is configured to execute instructions, including the instructions for process 200, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 11:
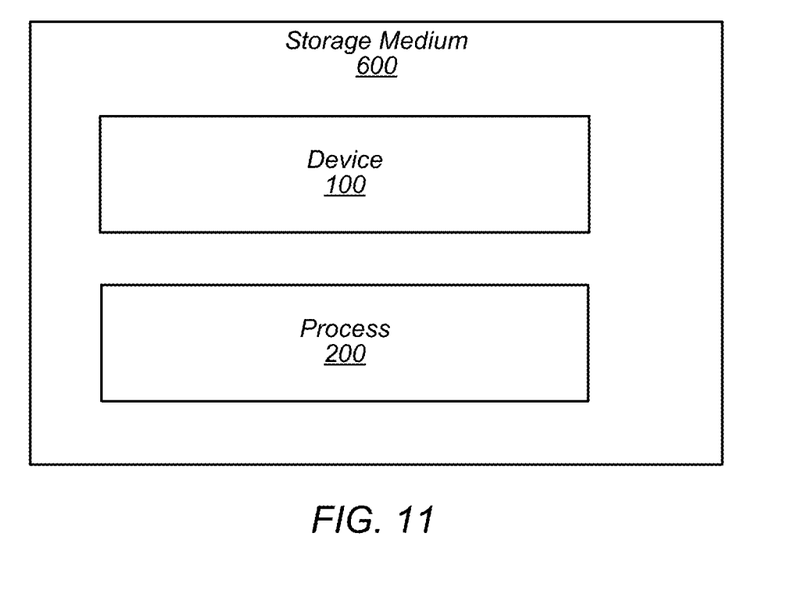
FIG. 11 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 11, other input/output (I/O) devices such as video hardware, audio hardware, user interface devices, networking hardware, etc.).

Turning now to FIG. 11, a block diagram of one embodiment of computer accessible storage medium 600 including one or more data structures representative of device 100 (depicted in FIG. 1) included in an integrated circuit design and one or more code sequences representative of process 200 (shown in FIG. 4). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
capturing an image of a user's face using a camera located on a device, the device comprising a computer processor and a memory, wherein the captured image comprises an image captured while illuminating the user's face with an illuminator located on the device;
generating, using the computer processor and based on the captured image, one or more landmark maps, each landmark map corresponding to a respective landmark feature of one or more landmark features of the user's face, wherein each of the one or more landmark maps has a lower resolution than the captured image, and wherein each of the one or more landmark maps comprises a plurality of values for regions of the captured image on the one or more landmark maps, each value corresponding to a respective region on the one or more landmark maps and representing a likelihood that the respective landmark feature is in the respective region;
identifying, using the computer processor, locations of one or more landmark features of the user's face on each of the one or more landmark maps based on the plurality of values for the regions on the one or more landmark maps;
generating, using the computer processor and based on the captured image, an occlusion map, wherein the occlusion map has the lower resolution than the captured image, and wherein the occlusion map comprises a plurality of occlusion value corresponding to a respective region on the occlusion map and occlusion value corresponding to a respective region on the occlusion map and representing a likelihood of occlusion in the respective region;
assessing, using the computer processor, an occlusion score for at least one landmark feature on at least one landmark map, wherein the occlusion score is assessed from the occlusion values for the regions on the occlusion map that correspond to the location of the at least one landmark feature based on the at least one landmark map; and
discarding the captured image in response to the assessed occlusion score being above a selected occlusion threshold.

2. The method of claim 1, further comprising controlling, using the computer processor, an operation of the device based on the assessed occlusion score.

3. The method of claim 1, wherein discarding the captured image comprises discarding the captured image from an enrollment process in response to the assessed occlusion score being above the selected occlusion threshold.

4. The method of claim 1, further comprising preventing unlocking of the device using a facial recognition authentication process in response to the assessed occlusion score being above the selected occlusion threshold.

5. The method of claim 1, wherein the at least one landmark feature comprises an eye of the user.

6. The method of claim 1, wherein the at least one landmark feature comprises a nose of the user.

7. The method of claim 1, wherein the at least one landmark feature comprises a mouth of the user.

8. The method of claim 1, wherein the identifying the locations of the one or more landmark features comprises:
identifying locations of one or more points associated with the one or more landmark features on each of the one or more landmark maps; and determining the location of the one or more landmark features based on the identified locations of the one or more points.

9. The method of claim 8, wherein identifying the locations of the one or more points comprises identifying x- and y-coordinates of the one or more points on the one or more landmark maps.

10. The method of claim 1, wherein assessing the occlusion score comprises determining a percentage of the at least one landmark feature that is not visible in the captured image based on the occlusion values for the respective regions that correspond to the location of the at least one landmark feature based on the at least one landmark map.

11. The method of claim 1, wherein assessing the occlusion score for the at least one landmark feature includes assessing an occlusion score for an object positioned between the camera and the face in the captured image.

12. A device, comprising:
a camera;
at least one illuminator providing infrared illumination;
circuitry coupled to the camera and the illuminator, wherein the circuitry is configured to:
  capture an image of a user's face using the camera, wherein the captured image comprises an image captured while illuminating the user's face with the at least one illuminator;
  generate one or more landmark maps based on the captured image, each landmark map corresponding to a respective landmark feature of one or more landmark features of the user's face, wherein each of the one or more landmark maps has a lower resolution than the captured image, and wherein each of the one or more landmark maps comprises a plurality of values for regions of the captured image on the one or more landmark maps, each value corresponding to a respective region on the one or more landmark maps and representing a likelihood that the respective landmark feature is in the respective region;
  identifying locations of one or more landmark features of the user's face on each of the one or more landmark maps based on the plurality of values for the regions on the one or more landmark maps;
  generate an occlusion map, based on the captured image, wherein the occlusion map has the lower resolution than the captured image, and wherein the occlusion map comprises a plurality of occlusion values for the regions of the captured image on the occlusion map, each occlusion value corresponding to a respective region on the occlusion map and representing a likelihood of occlusion in the respective region;
  assess an occlusion score for at least one landmark feature on at least one landmark map, wherein the occlusion score is assessed from the occlusion values for the regions on the occlusion map that correspond to the location of the at least one landmark feature based on the at least one landmark map; and
  discard the captured image in response to the assessed occlusion score being above a selected occlusion threshold.

13. The device of claim 12, wherein the at least one illuminator comprises a flood infrared illuminator and a speckle pattern illuminator.

14. The device of claim 12, wherein the circuitry is configured to authenticate the user to use the device using facial recognition authentication of the user.

15. The device of claim 12, wherein the circuitry is configured to operate a facial recognition process using the occlusion map.

16. The device of claim 12, wherein the occlusion values for the respective regions on the occlusion map comprise scaled values of occlusion in the respective regions.

17. A non-transient computer-readable medium including instructions that, when executed by one or more processors, causes the one or more processors to perform a method, comprising:
capturing an image of a user's face using a camera located on a device, the device comprising a computer processor and a memory, wherein the captured image comprises an image captured while illuminating the user's face with an illuminator located on the device;
generating, using the computer processor and based on the captured image, one or more landmark maps, each landmark map corresponding to a respective landmark feature of one or more land mark features of the user's face, wherein each of the one or more landmark maps has a lower resolution than the captured image, and wherein each of the one ore more landmark maps comprises a plurality of values for regions of the captured image on the one or more landmark maps, each value corresponding to a respective region on the one or more landmark maps and representing a likelihood that the respective landmark feature is in the respective region;
identifying, using the computer processor, locations of one or more landmark features of the user's face on each of the one or more landmark maps based on the plurality of values for the regions on the one or more landmark maps;
generating, using the computer processor and based on the captured image, an occlusion map, wherein the occlusion map has the lower resolution than the captured image, and wherein the occlusion map comprises a plurality of occlusion value corresponding to a respective region on the occlusion map, each occlusion value corresponding to a respective region on the occlusion map and representing a likelihood of occlusion in the respective region;
assessing, using the computer processor, an occlusion score for at least one landmark feature on at least one landmark map, wherein the occlusion score is assessed from the occlusion values for the regions on the occlusion map that correspond to the location of the at least one landmark feature based on the at least one landmark map; and
discarding the captured image in response to the assessed occlusion score being above a selected occlusion threshold.

18. The non-transient computer-readable medium of claim 17, wherein discarding the captured image comprises discarding the captured image from an enrollment process in response to the assessed occlusion score being above the selected occlusion threshold.

19. The non-transient computer-readable medium of claim 17, further comprising preventing unlocking of the device using a facial recognition authentication process in response to the assessed occlusion score being above the selected occlusion threshold.

20. The non-transient computer-readable medium of claim 17, wherein the at least one landmark feature is an eye, a nose, or a mouth of the user.

* * * * *